United States Patent [19]

Okuno et al.

[11] Patent Number: 4,510,181

[45] Date of Patent: Apr. 9, 1985

[54] METHOD FOR COATING METAL SURFACE

[75] Inventors: Toshimitsu Okuno; Yutaka Hori; Makoto Sunakawa; Sadayuki Inagaki, all of Osaka, Japan

[73] Assignee: Nitto Electric Industrial Co., Ltd., Osaka, Japan

[21] Appl. No.: 566,453

[22] Filed: Dec. 28, 1983

[30] Foreign Application Priority Data

Dec. 29, 1982 [JP] Japan .................................. 57-228209

[51] Int. Cl.$^3$ ............................................. B32B 35/00
[52] U.S. Cl. .................................... 427/142; 156/187; 422/8; 427/388.2
[58] Field of Search .......................... 156/187; 87/1, 6; 427/142, 388.2; 422/8

[56] References Cited

U.S. PATENT DOCUMENTS 4,373,077  2/1983  Boeder ................................. 526/309
4,439,291  3/1984  Irving et al. ...................... 526/313 X Primary Examiner—Thurman K. Page Attorney, Agent, or Firm—Sughrue, Mion, Zinn, Macpeak & Seas

[57] ABSTRACT

A method for coating a metal surface by forming a corrosion-protective layer on the metal surface or a defective area of a corrosion-protective layer formed on the metal surface, which comprises using a coating material selected from the group consisting of a tape-like, sheet-like and chip-like polymerizable coating material comprising a vinyl monomer and/or a vinyl group-containing oligomer and a liquid material comprising a vinyl monomer and/or a vinyl group-containing oligomer, wherein either the coating material or the liquid material contains a polymerization initiator and the material not containing the polymerization initiator contains a polymerization accelerator, and polymerizing the vinyl monomer and/or the vinyl monomer-containing oligomer in the state such that the metal surface or the defective area is covered with the coating material by interposing the liquid material therebetween, to form the corrosion-protective layer.

21 Claims, No Drawings

METHOD FOR COATING METAL SURFACE

FIELD OF THE INVENTION

The present invention relates to a method for coating a metal surface and, more particularly, a method for coating a metal surface by forming a corrosion-protective coating layer on the metal surface, including the pipeline joints, or on defective areas on metal surfaces coated with a corrosion-protective layer to prevent corrosion of the metal. This invention provides a method for coating a metal surface with a corrosion-protective coating layer which does not form defective portions, i.e. unbonded portions, between the metal surface and the corrosion-protective layer.

BACKGROUND OF THE INVENTION

Methods for forming a corrosion-protective coating layer on a metal surface generally include a hot coating method which is carried out on the production line and a cold coating method which is carried out on the work site.

The hot coating method employs a lining of a molten polyethylene resin, a molten epoxy resin or the like. This method, however, suffers from several disadvantages, i.e. the lining is complicated, a large amount of heat capacity is required, the lining tends to be damaged during storage or transportation, and it is difficult to form the lining on pipeline joints.

On the other hand, the cold coating method, which uses a polymerization-curable polyurethane resin or epoxy resin having a film-forming ability, is also disadvantageous is that it is difficult to obtain a uniform coating. Further, in the case where a two-part system is used, the resulting coating tends to have uneven properties due to the variation of the mixing ratio.

Another method is known where protective material in the form of tape or sheet with a pressure-sensitive adhesive layer formed on one side thereof is wound around or stuck to the metal surface. This method is advantageous because a coating layer of uniform thickness can be formed by a simple press-bonding means. However, this methed is disadvantageous because the cohesive force of the adhesive layer is comparatively low, and formation of wrinkles and lifting arise due to the ambient temperature or soil pressure.

SUMMARY OF THE INVENTION

Accordingly, an object of this invention is to provide a method for coating a metal surface which provides a uniform corrosion-protective coating layer at normal temperature without using a heating means that requires a large amount of heat.

Another object of this invention is to provide a method for coating a metal surface which provides a corrosion-protective coating layer formed from a tough film having a uniform thickness without using a harmful material such as organic solvents in the course of formation of the corrosion-protective coating layer.

The above-described objects have been met by a method for coating a metal surface by forming a corrosion-protective layer on the metal surface or a defective area of a corrosion-protective layer formed on the metal surface, which comprises using a coating material selected from the group consisting of a tape-like, sheet-like and chip-like polymerizable coating material comprising a vinyl monomer and/or a vinyl group-containing oligomer and a liquid material comprising a vinyl monomer and/or a vinyl group-containing oligomer, wherein either the coating material or the liquid material contains a polymerization initiator and the material not containing the polymerization initiator contains a polymerization accelarator, and polymerizing the vinyl monomer and/or the vinyl monomer-containing oligomer in the state such that the metal surface or the defective area is covered with the coating material by interposing the liquid material therebetween, to form the corrosion-protective layer.

DETAILED DESCRIPTION OF THE INVENTION

According to the metal surface coating method of this invention, since the coating material is applied with a liquid material interposed between the coating material and the metal surface or defective area, the coating material swells and softens temporarily and exhibits a sufficient wettability to the metal surface or defective area which is in a rough surface state, thereby uniformly adhering thereto. Simultaneously, the coating material is polymerized by the action of the polymerization initiator and polymerization accelerator contained in the system. Thus, a homogeneous corrosion-protective coating layer made of a tough film having a uniform thickness is formed with firm bonding on the metal surface or defective area.

In one embodiment of this invention, the metal surface or defective area is coated with the liquid material comprising a vinyl monomer and/or a vinyl group-containing oligomer containing a polymerization accelerator and then the liquid material is wrapped or bonded with a self-supporting tape-like, sheet-like or chip-like polymerizable coating material comprising a vinyl monomer and/or a vinyl group-containing oligomer containing a polymerization initiator. The liquid material permeates into the coating material to swell and soften it causing it to come into intimate contact with the metal surface or defective area. The polymerization initiator and polymerization accelerator undergo a redox reaction to generate active radicals which polymerize the vinyl monomer and/or vinyl grop-containing oligomer in the system. Thus, a homogeneous corrosion-protective coating layer is formed on the metal surface or defective area.

In another embodiment of this invention, one side of the polymerizable coating material is backed with a self-supporting material such as a plastic film or sheet, a rubber sheet, a foamed sheet, or a composite material thereof.

The above-mentioned backing material can function as an auxiliary material when the coating material is wrapped or bonded to the metal surface or defective area and also exhibits a protective function such that it protects the corrosion-protective coating layer from damage by external impact and degradation by light. The backing material also functions as a substrate for the coating material. In other words, the backing material facilitates the handling of the coating material comprising a vinyl monomer and/or vinyl group-containing oligomer, which is usually in the form of clay, paste or the like, from the standpoint of the intimate contact with the metal surface or defective area. It is preferred that the backing material be treated with, for example, a primer to improve the adhesion to the coating material.

It will be understood from the foregoing that the corrosion-protective coating layer may be formed by the combination of a coating material containing a polymerization initiator and a liquid material containing a polymerization accelerator, as well as the combination of a coating material containing a polymerization accelerator and a liquid material containing a polymerization initiator.

The tape-like, sheet-like, or chip-like polymerizable coating material used in the present invention comprises a vinyl monomer and/or a vinyl group-containing oligomer.

The vinyl monomer and/or the vinyl group-containing oligomer is not specifically limited. Either a monofunctional monomer or oligomer and a polyfunctional monomer or oligomer can be used so long as it can be polymerized by active radicals generated by the decomposition of the polymerization initiator.

Specific examples of the monofunctional vinyl monomer include alkyl or cycloalkyl acrylate or methacrylate such as methyl(meth)acrylate, ethyl(meth)acrylate, n-butyl(meth)acrylate, isobutyl(meth)acrylate, cyclohexyl(meth)acrylate, 2-ethylhexyl(meth)acrylate, decyl(meth)acrylate or lauryl(meth)acrylate; vinyl acetate; vinyl propionate; (meth)acrylonitrile; styrene; vinyltoluene; (meth)acrylic acid; hydroxy ester of (meth)acrylic acid such as 2-hydroxyethyl(meth)-acrylate or 2-hydroxypropyl(meth)acrylate; glycidyl (meth)acrylate; and diethylaminoethyl(meth)acrylate.

Specific examples of the polyfunctional vinyl monomer include ethylene glycol or propylene glycol diesters of (meth)acrylic acid such as ethylene glycol di(meth)acrylate, diethylene glycol di(meth)acrylate or triethylene glycol di(meth)acrylate; trimethylolpropane tri(meth)acrylate; and tetramethylolpropane tetra(meth)acrylate.

Specific examples of the monofunctional oligomer include polyester mono(meth)acrylate obtained by the reaction of polyester resin and (meth)acrylic acid.

Specific examples of the polyfunctional oligomer include polyethylene glycol di(meth)acrylate; epoxy (meth)acrylate obtained by the reaction of epoxy resin and (meth)acrylic acid; urethane(meth)acrylate obtained by the reaction of polyisocyanate and hydroxyacryl(meth)acrylate; polyester di(meth)acrylate obtained by the reaction of polyester resin and (meth)acrylic acid; and polyether di(meth)acrylate obtained by the reaction of polyester resin and (meth)acrylic acid.

Viscosity increasing materials or additives may be added, if necessary and desired, to the coating material to maintain the self-supporting property thereof. The amount of the viscosity increasing materials employed is 5 to 95% by weight based on the weight of the coating material and the amount of the additives employed is 1 to 50% by weight based on the weight of the coating material.

The liquid material which is interposed between the coating material and the metal surface or defective area comprises a vinyl monomer and/or vinyl group-containing oligomer as described above. Viscosity increasing materials and/or additives may be added to the liquid material in an appropriate amount. The viscosity of the liquid material is preferably adjusted to 0.01 to 1,000 poise (25° C.) for easy handling.

Examples of the viscosity increasing materials include polymers of the vinyl monomers; copolymers of the monomer and a monomer copolymerizable therewith, such as a monomer having a functional group, e.g., a carboxyl group, a hydroxyl group, an amino group, a methylol group, or a glycidyl group; synthetic resins such as polyester resins, polybutyral resins, polyacrylate resins, polyether resins, polyamide resins, polyurethane resins, or chlorosulfonate polyethylene resins; and rubbers such as natural rubbers, styrene-isoprene rubbers, styrene-butadiene rubbers, butyl rubbers, or polyisobutylene rubbers.

Examples of the additives include fillers, plasticizers, anti-aging agents, anti-microbial agents, antioxidants, UV light absorbers, antiozonants, thixotropic agents and rust inhibitors.

The vinyl monomer and/or vinyl group-containing oligomer constituting the liquid material functions as a carrier for the polymerization initiator or polymerization accelerator and also acts to swell and soften the coating material.

Either the coating material or the liquid material contains an organic peroxide as the polymerization initiator. Examples of the organic peroxide include ketone peroxide such as methyl ethyl ketone peroxide; hydroperoxide such as cumene hydroperoxide; and diacyl peroxide such as benzoyl peroxide.

The polymerization initiator is incorporated in an amount of 0.01 to 10 parts by weight, preferably 0.1 to 5 parts by weight, per 100 parts by weight of the vinyl monomer and/or vinyl group-containing oligomer in the coating material or liquid material.

The system containing the polymerization initiator may further contain a polymerization inhibitor in an amount of one-tenth of the polymerization initiator in order to improve its storage properties.

Examples of polymerization inhibitors include hydroquinone, hydroquinone monomethyl ether, methylhydroquinone, p-benzoquinone, catechol, phenoazine picrate, A-butyl catechol, 2-butyl-4-hydroxyanisole and 2,6-di-t-butyl-p-cresol.

The polymerization accelerator employed in the invention is one which decomposes the polymerization initiator through a redox reaction and easily generates active radicals.

Examples of the polymerization accelerator include dimethyl aniline, dimethyl-p-toluidine, diethyl-p-toluidine, diisopropyl-p-toluidine, cobalt naphthenate, copper naphthenate, zinc naphthenate, thiourea, acetylthiourea, sodium ascorbate, a condensate of n-butyl aldehyde and aniline, vanadium pentoxide, and combinations thereof.

The polymerization accelerator is incorporated in an amount of 0.1 to 10 parts by weight per 100 parts by weight of the vinyl monomer and/or vinyl group-containing oligomer in the coating material or liquid material.

In this invention, the liquid material, comprising the vinyl monomer and/or vinyl group-containing oligomer containing either the polymerization accelerator or the polymerization initiator, is applied to the tapelike, sheet-like, or chip-like polymerizable coating material comprising the vinyl monomer and/or vinyl group-containing oligomer containing either the polymerization initiator or the polymerization accelerator, or to the metal surface or defective area of the corrosion-protective layer, or to both. With the liquid material interposed between the coating material and the metal surface or defective area, the coating material is wrapped once or more around or bonded to the metal surface or defective area. The liquid material permeates into the coating material to swell and soften it; permitting it to come into intimate contact uniformly and firmly with the metal surface or defective area. The active radicals cause the vinyl monomer and/or vinyl group-containing oligomer to polymerize at normal room temperature to form a tough uniform corrosion-protective coating layer on the metal surface or defective area. The above steps may be carried out with heating to promote the polymerization.

The method for coating a metal surface of this invention has the following characteristics:

(1) The polymerization of the vinyl monomer and/or vinyl group-containing oligomer is brought about by the active radicals generated upon the reaction of the polymerization initiator and polymerization accelerator. Moreover, the polymerization proceeds continuously from the point of radical generation. Therefore, a uniform corrosion-protective layer having no defective portions i.e. unbonded portions is formed.

(2) Heating is not required, and on site operation is simple.

(3) It is possible to form, without special skill a corrosion-protective coating layer of uniform thickness due to the use of the polymerizable coating material which has previously been formed in a uniform thickness.

(4) The resulting coating layer is composed of a polymer and is therefore superior in corrosion-protective, heat resistance, and physical properties.

The invention is now described in detail by reference to the following examples, in which "parts" means "parts by weight". The following examples are in no way intended to limit the scope of the present invention.

EXAMPLE 1

A mixture of 100 parts of a soluble polyester resin, 40 parts of bisphenol A epoxy diacrylate, and 1.5 parts of cumene hydroperoxide was mixed with a kneader and then extruded with an extruder to prepare a 0.5 mm thick sheet-like polymerizable coating material.

The coating material was cut into a sample having a width of 70 mm and a length of 150 mm. The sample was bonded to a steel plate having a thickness of 1 mm, a width of 70 mm and a length of 150 mm using a liquid material composed of 100 parts of methyl methacrylate and 2 parts of zinc naphthenate in a coating amount of 100 g/m² to obtain a specimen. The resulting specimen was stored at 25° C. for 36 hours.

After storage, the corrosion-protective coating layer was subject to the crosscut test according to JIS K 5400. The sample was rated at 10 points, i.e., perfect.

Further, the same coating material was cut into a 50 mm wide tape. The tape was wrapped, with partial overlapping, around a steel pipe having a diameter of 100 mm, while being coated with the liquid material (100 g/m²). After storage at 25° C. for 36 hours, the covered pipe was evaluated with respect to water-tightness. Satisfactory results were obtained.

Moreover, the corrosion-protective coating layer formed on the steel pipe was cut and peeled off by force to observe the overlapped part. It was found that the steps at the overlapped part were completely filled and no voids were formed.

EXAMPLE 2

A mixture of 100 parts of a polybutyral resin, 10 parts of methyl methacrylate, 40 parts of triethylene glycol dimethacrylate and 1.5 parts of a condensate of n-butyl aldehyde and aniline was mixed with a kneader and applied onto a 0.3 mm thick polyethylene sheet in a thickness of 0.3 mm to obtain a sheet-like polymerizable coating material.

Next, a liquid material was prepared from 80 parts of methyl methacrylate, 20 parts of polyester methacrylate, 4 parts of benzoyl peroxide and 0.01 parts of hydroquinone.

Using the coating material and liquid substance thus prepared, the properties of the corrosion-protective coating layer were evaluated in the same manner as in Example 1. The liquid material was applied in an amount of 60 g/m² and the samples were stored at 20° C. for 24 hours. The crosscut test results, performed after the polyethylene sheet had been peeled off, gave 10 points, and the water-tightness was satisfactory.

EXAMPLES 3 TO 6

Polymerizable coating materials and liquid materials were prepared from the mixtures shown in Table 1 in the same manner as in Example 2, and the properties of the corrosion-protective layers were evaluated.

The results obtained are shown in Table 1 below.

TABLE 1

| | Example 3 | Example 4 | Example 5 | Example 6 |
|---|---|---|---|---|
| Self-supporting material | 0.3 mm thick polyethylene sheet | 0.3 mm thick polyethylene sheet | 0.3 mm thick polyethylene sheet | 0.3 mm thick polyethylene sheet |
| Polymerizable coating material | | | | |
| Composition (parts) | Bisphenol F epoxy dimethacrylate (80) Dibutyl methacrylate (20) Talc (30) Silica fine powder (10) Cobalt naphthenate (2.4) | Ethyl acrylate-butyl acrylate copolymer (4:1) (100) Polyester polymethacrylate (20) Ethyl acrylate (10) Dimethylaniline (1) | Polyester urethane acrylate (100) Precipitated calcium carbonate (50) Benzoyl peroxide (2) Hydroquinone (0.01) | Soluble polyester resin (100) Polyethylene glycol dimethacrylate (30) Methyl methacrylate (20) Magnesium silicate fine powder (50) Cumene hydroperoxide (3) |
| Thickness (mm) | 0.2 | 0.25 | 0.3 | 0.4 |
| Liquid material | | | | |
| Composition (parts) | Methyl methacrylate (100) Methyl ethyl ketone peroxide (3) | Ethyl acrylate (50) 2-Ethylhexyl acrylate (30) 2-Hydroxyethyl acrylate (20) Benzoyl peroxide (2) Hydroquijone monoethyl ether (0.005) | Butyl methacrylate (50) Polyester urethane acrylate (50) Diethyl-p-toluidine (3) | 2-Hydroxyethyl methacrylate (40) Methyl methacrylate (60) Nitric acid solution of vanadium pentoxide (0.5) |
| Coating amount | 40 | 150 | 100 | 80 |

TABLE 1-continued

| | Example 3 | Example 4 | Example 5 | Example 6 |
|---|---|---|---|---|
| (g/m$^2$) | | | | |
| Polymerization conditions | 25° C., 36 hr | 20° C., 24 hr | 20° C., 8 hr | 60° C., 4 hr |
| Crosscut test | 10 points | 10 points | 10 points | 10 points |
| Water-tightness | Good | Good | Good | Good |
| Voids | None | None | None | None |

While the invention has been described in detail and with reference to specific embodiments thereof, it will be apparent to one skilled in the art that various changes and modifications can be made therein without departing from the spirit and scope thereof.

We claim:

1. A method for coating a metal surface by forming a corrosion-protective layer on the metal surface or on defective areas of a corrosion-protective layer on a metal surface comprising:

(a) coating the metal surface, defective areas, or a coating material with a liquid material comprising a vinyl monomer and/or a vinyl group-containing oligomer;

(b) wrapping or bonding the coating material which is selected from the group consisting of a tape-like, sheet-like and chip-like polymerizable coating comprising a vinyl monomer and/or a vinyl group-containing oligomer, to the metal surface or defective area such that the liquid material is interposed between the coating material and the metal surface or defective area; and (c) polymerizing the vinyl monomer and/or the vinyl group-containing oligomer to form the corrosion-protective layer; wherein the vinyl monomer and/or vinyl group-containing oligomer is selected from the group consisting of monofunctional monomer or oligomer and a polyfunctional monomer or oligomer; and wherein either the coating material or the liquid material contains a polymerization initiator and the material not containing the polymerization initiator contains a polymerization accelerator.

2. The method as claimed in claim 1, wherein one side of the polymerizable coating material is backed with a self-supporting material.

3. The method as claimed in claim 1, wherein said monofunctional monomer is selected from the group consisting of alkyl acrylate, cycloalkyl acrylate, alkyl methacrylate, cycloalkyl methacrylate, vinyl acetate; vinyl propionate; (meth)acrylonitrile; styrene; vinyltoluene; (meth)acrylic acid; hydroxy ester of (meth)acrylic acid; glycidyl (meth)acrylate; and diethylaminoethyl(meth)acrylate.

4. The method as claimed in claim 3, wherein said alkyl acrylate or alkyl methacrylate is selected from the group consisting of methyl(meth)acrylate, ethyl(meth)acrylate, n-butyl(meth)acrylate, isobutyl(meth)acrylate, cyclohexyl(meth)acrylate, 2-ethylhexyl(meth)acrylate, decyl(meth)acrylate and lauryl(meth)acrylate.

5. The method as claimed in claim 3, wherein said hydroxy ester of (meth)acrylic acid is selected from the group consisting of 2-hydroxyethyl(meth)acrylate and 2-hydroxypropyl(meth)acrylate.

6. The method as claimed in claim 1, wherein said polyfunctional vinyl monomer is selected from the group consisting of ethylene glycol, propylene glycol, diesters of (meth)acrylic acid, trimethylolpropane tri(meth)acrylate and tetramethylol propane tetra(meth)acrylate.

7. The method as claimed in claim 6, wherein said diester of (meth)acrylic acid is selected from the group consisting of ethylene glycol di(meth)acrylate and diethylene glycol di(meth)acrylate and triethylene glycol tri(meth)acrylate.

8. The method as claimed in claim 1, wherein said monofunctional oligomer is polyester mono(meth)acrylate obtained by the reaction of polyester resin and (meth)acrylic acid.

9. The method as claimed in claim 1, wherein said polyfunctional oligomer is selected from the group consisting of polyethylene glycol di(meth)acrylate; epoxy(meth)acrylate obtained by the reaction of epoxy resin and (meth)acrylic acid; urethane (meth)acrylate obtained by the reaction of polyisocyanate and hydroxyacryl(meth)acrylate; polyester di(meth)acrylate obtained by the reaction of polyester resin and (meth)acrylic acid; and polyether di(meth)acrylate obtained by the reaction of polyester resin and (meth)acrylic acid.

10. The method as claimed in claim 1 or claim 2, wherein viscosity increasing materials or additives are added to either the coating material, the liquid material, or to both.

11. The method as claimed in claim 10, wherein said viscosity increasing materials are selected from the group consisting of polymers of said vinyl monomer, copolymers of said vinyl monomer and a monomer copolymerizable therewith; synthetic resins; and rubbers.

12. The method as claimed in claim 10, wherein said additives are selected from the group consisting of fillers, plasticizers; anti-aging agents, antimicrobial agents, antioxidants, UV light absorbers, antiozonants, thixotropic agents and rust inhibitors.

13. The method as claimed in claim 1, wherein said polymerization initiator is an organic peroxide.

14. The method as claimed in claim 13, wherein said organic peroxide is selected from the group consisting of ketone peroxide, hydroperoxide; and diacyl peroxide.

15. The method as claimed in claim 1, wherein said polymerization initiator is employed in an amount of from 0.01 to 10 parts by weight based on 100 parts by weight of the vinyl monomer and/or vinyl group-containing oligomer in the coating material or liquid material.

16. The metod as claimed in claim 1, wherein said polymerization initiator is employed in an amount of from 0.1 to 5 parts by weight based on 100 parts by weight of the vinyl monomer and/or vinyl group-containing oligomer in the coating material or liquid material.

17. The method as claimed in claim 1, wherein the polymerization initiator additionally contains a polymerization inhibitor.

18. The method as claimed in claim 17, wherein said polymerization inhibitor is selected from the group consisting of hydroquinone, hydroquinone monomethyl ether, methyl hydroquinone, p-benzoquinone, catechol, phenoazine picrate, A-butyl catechol, 2-butyl-4-hydroxyanisole and 2,6-di-t-butyl-p-cresol.

19. The method as claimed in claim 1, wherein said polymerization accelerator is selected from at least one member of the group consisting of dimethyl aniline, dimethyl-p-toluidine, diethyl-p-toluidine, diisopropyl-p-toluidine, cobalt naphthenate, copper napthenate, zinc napthenate, thiourea, acetylthiourea, sodium ascorbate, a condensate of n-butyl aldehyde and aniline, vanadium pentoxide.

20. The method as claimed in claim 2, wherein said self-supporting material is selected from the group consisting of a plastic film, a plastic sheet, a rubber sheet, a foamed sheet, and a composite material thereof.

21. The method as claimed in claim 1, wherein said liquid material is applied to at least one of the covering material and the metal surface or defective area.

* * * * *